(12) United States Patent
Boettcher

(10) Patent No.: US 11,390,224 B2
(45) Date of Patent: Jul. 19, 2022

(54) FABRIC PROCESSING METHOD AND COMPONENT

(71) Applicant: Honda Motor Co., Ltd., Tokyo (JP)

(72) Inventor: Eric J. Boettcher, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 69 days.

(21) Appl. No.: 16/563,164

(22) Filed: Sep. 6, 2019

(65) Prior Publication Data

US 2019/0389398 A1 Dec. 26, 2019

Related U.S. Application Data

(62) Division of application No. 15/460,371, filed on Mar. 16, 2017, now Pat. No. 10,434,956.

(Continued)

(51) Int. Cl.
*B60R 13/02* (2006.01)
*B29B 11/16* (2006.01)
(Continued)

(52) U.S. Cl.
CPC ............. *B60R 13/02* (2013.01); *B29B 11/16* (2013.01); *B29C 70/34* (2013.01); *B32B 1/00* (2013.01); *B32B 3/08* (2013.01); *B32B 3/14* (2013.01); *B32B 3/18* (2013.01); *B32B 3/263* (2013.01); *B32B 5/06* (2013.01); *B32B 5/26* (2013.01);
(Continued)

(58) Field of Classification Search
CPC . Y10T 428/24033; B29C 65/62; B29C 65/72; B29C 70/02; B29C 70/021; B29C 70/025; B29C 70/06; B29C 70/10; B29C 70/16; B29C 70/20–24; B29C 66/721; B29C 66/7212; B29D 23/00–24; B29D 24/00–008; B64C 1/06–12; B64C 3/182–187; B64C 3/26; B32B 5/06; B32B 5/10; B32B 5/12; B32B 5/24; B32B 5/26; B32B 5/28; B32B 2262/10; B32B 2262/101; B32B 2262/106

See application file for complete search history.

(56) References Cited

U.S. PATENT DOCUMENTS 3,656,233 A * 4/1972 Overholser ............. B29C 70/74
174/75 C
4,331,495 A * 5/1982 Lackman .................. B64C 1/12
112/440

(Continued)

OTHER PUBLICATIONS

Ogale et al. "Tailoring of Textile Preforms for Fibre-reinforced Polymer Composites" Journal of Industrial Textiles, 2004, vol. 34, No. 2, pp. 77-96.

(Continued)

*Primary Examiner* — Z. Jim Yang
(74) *Attorney, Agent, or Firm* — Rankin, Hill & Clark LLP

(57) ABSTRACT

A fabric processing method and component (e.g., a vehicle component) includes providing and/or arranging a first fabric charge and a second fabric charge. A multi-piece fabric assembly is formed for single stage draping by stitching together the first and second fabric charges along a neutral stitching path. The multi-piece fabric assembly is formed into a three-dimensional shape and is then impregnated with a polymeric material to form the component.

14 Claims, 13 Drawing Sheets

Related U.S. Application Data

(60) Provisional application No. 62/313,083, filed on Mar. 24, 2016.

(51) Int. Cl.

| | | |
|---|---|---|
| *B29C 70/34* | (2006.01) | |
| *B32B 1/00* | (2006.01) | |
| *B32B 3/08* | (2006.01) | |
| *B32B 3/14* | (2006.01) | |
| *B32B 3/18* | (2006.01) | |
| *B32B 3/26* | (2006.01) | |
| *B32B 5/06* | (2006.01) | |
| *B32B 5/26* | (2006.01) | |
| *B29C 70/00* | (2006.01) | |
| *B29C 65/72* | (2006.01) | |
| *B29C 65/62* | (2006.01) | |

(52) U.S. Cl.
CPC ............ *B29C 65/62* (2013.01); *B29C 65/72* (2013.01); *B29C 70/00* (2013.01); *B32B 2250/20* (2013.01); *B32B 2260/023* (2013.01); *B32B 2260/046* (2013.01); *B32B 2262/106* (2013.01); *B32B 2605/00* (2013.01); *Y10T 428/18* (2015.01); *Y10T 428/24033* (2015.01); *Y10T 428/24628* (2015.01)

(56) References Cited

U.S. PATENT DOCUMENTS

| | | | |
|---|---|---|---|
| 4,410,577 A | 10/1983 | Palmer et al. | |
| 4,478,661 A * | 10/1984 | Lewis | B29C 66/4322 138/119 |
| 4,596,056 A | 6/1986 | Grick | |
| 4,622,254 A * | 11/1986 | Nishimura | B32B 5/26 428/113 |
| 4,966,802 A * | 10/1990 | Hertzberg | B29D 99/0003 428/113 |
| 5,055,242 A | 10/1991 | Vane | |
| 5,100,713 A * | 3/1992 | Homma | D03D 15/573 428/113 |
| 5,160,471 A | 11/1992 | Vives et al. | |
| 5,429,853 A * | 7/1995 | Darrieux | D04H 3/07 428/113 |
| 5,460,673 A * | 10/1995 | Cahuzac | D04H 1/45 156/92 |
| 5,651,848 A | 7/1997 | Cohee et al. | |
| 5,664,518 A | 9/1997 | Lewit et al. | |
| 5,780,123 A * | 7/1998 | Kamiyama | B29C 65/62 428/36.1 |
| 5,874,151 A | 2/1999 | Cohee et al. | |
| 5,882,765 A * | 3/1999 | Pastureau | D04H 13/00 428/105 |
| 6,723,271 B2 | 4/2004 | Hemphill et al. | |
| 7,790,637 B2 | 9/2010 | Difonzo et al. | |
| 7,918,172 B2 | 4/2011 | Weimer | |
| 7,922,853 B2 | 4/2011 | Edelmann et al. | |
| 7,942,993 B2 | 5/2011 | Gessler et al. | |
| 8,282,874 B2 | 10/2012 | Stiesdal | |
| 8,512,620 B2 | 8/2013 | Lonsdorfer et al. | |
| 8,685,297 B2 | 4/2014 | Schreiber | |
| 2002/0081415 A1 * | 6/2002 | Toi | B29C 70/443 428/102 |
| 2004/0005435 A1 * | 1/2004 | GangaRao | B29C 70/24 428/102 |
| 2004/0038016 A1 | 2/2004 | Morozumi et al. | |
| 2004/0074589 A1 | 4/2004 | Gessler et al. | |
| 2004/0183227 A1 * | 9/2004 | Velicki | B29C 66/721 264/258 |
| 2004/0201252 A1 * | 10/2004 | Bechtold | F16F 7/124 296/187.03 |
| 2006/0048890 A1 * | 3/2006 | Sato | B29D 99/0003 156/285 |
| 2009/0110872 A1 | 4/2009 | Difonzo et al. | |
| 2010/0096067 A1 * | 4/2010 | Dunleavy | B29C 70/545 156/93 |
| 2010/0186882 A1 * | 7/2010 | Edelmann | B29C 53/04 156/217 |
| 2011/0020595 A1 * | 1/2011 | Kolax | B29C 70/086 428/116 |
| 2011/0064908 A1 * | 3/2011 | Kweder | B29C 70/345 428/113 |
| 2012/0312407 A1 * | 12/2012 | Muhlin | B29C 53/385 156/60 |
| 2013/0020013 A1 * | 1/2013 | Shimohara | B29C 65/62 156/93 |
| 2013/0091675 A1 * | 4/2013 | Seack | D04H 1/00 28/140 |
| 2013/0092794 A1 * | 4/2013 | Seack | B29B 11/16 28/143 |
| 2013/0207321 A1 | 8/2013 | Grove-nielsen | |
| 2014/0186574 A1 | 7/2014 | Goehlich | |
| 2014/0225297 A1 | 8/2014 | Richard et al. | |
| 2015/0338014 A1 * | 11/2015 | Bichler | F16L 55/1651 138/98 |
| 2018/0126598 A1 * | 5/2018 | Hollander | B32B 5/245 |

OTHER PUBLICATIONS

Brandt et al. "Sewing lessons for aerospace engineers." Machine Design, online publication; URL: http://machinedesign.com/archive/sewing-lessons-aerospace-engineers [accessed Aug. 13, 2014].

International Search Report and Written Opinion of PCT/US2017/022633 dated Jun. 8, 2017, 9 pages.

* cited by examiner

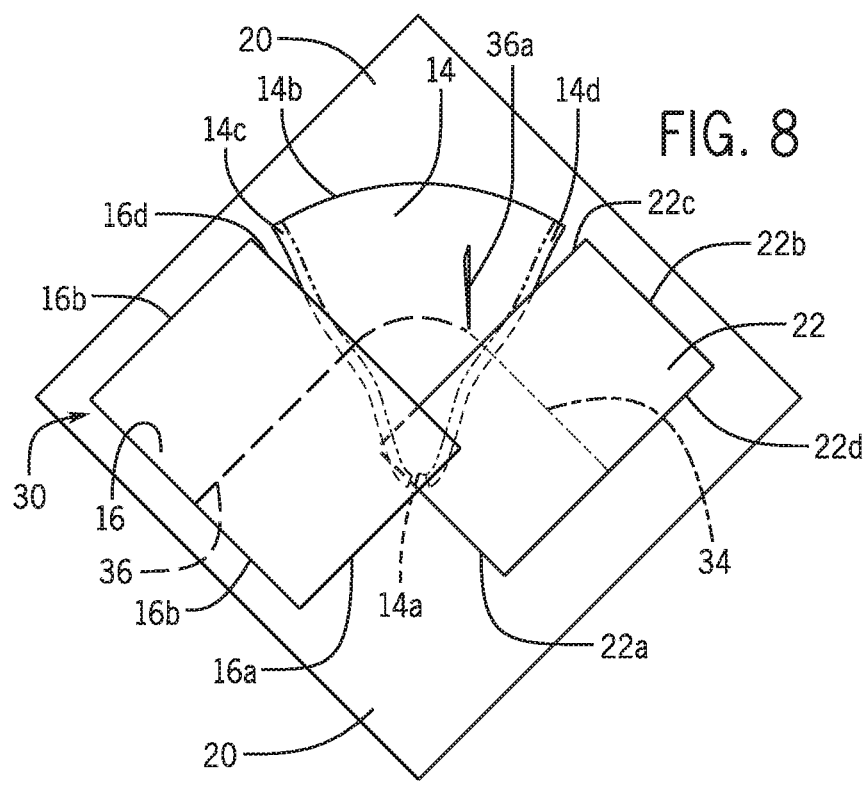
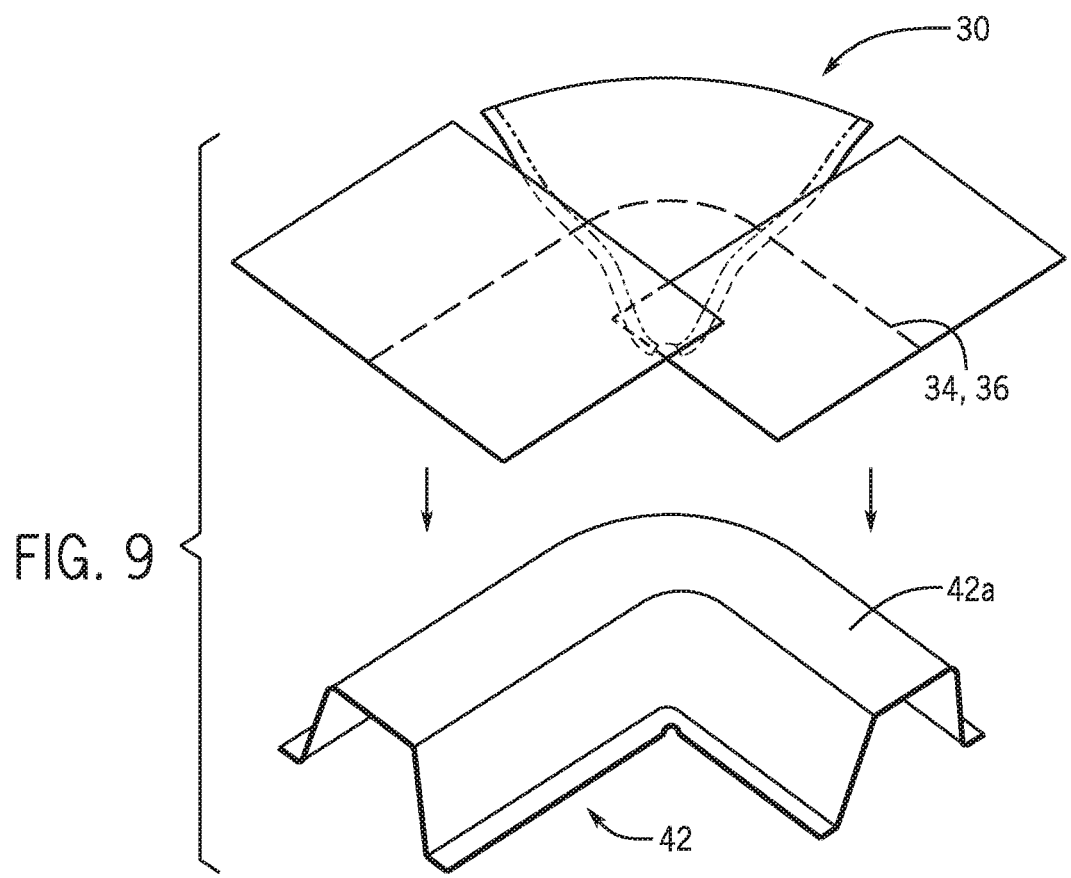

FABRIC PROCESSING METHOD AND COMPONENT

CROSS-REFERENCE TO RELATED APPLICATION

This application is a divisional of U.S. application Ser. No. 15/460,371 filed on Mar. 16, 2017, which is incorporated by reference in its entirety herein. U.S. application Ser. No. 15/460,371 claims the benefit of U.S. provisional patent application Ser. No. 62/313,083, filed Mar. 24, 2016, which is also incorporated by reference in its entirety herein.

BACKGROUND

Increasingly, vehicle manufacturers look to new materials and methods to increase structural integrity on vehicles, improve safety, reduce vehicle weight, etc. A preferred material for such purposes is carbon fiber reinforced plastic (CFRP). However, current CFRP processing methods are not efficient, particularly when working with very expensive raw materials. Specifically, yield rates are too low and this problem is particularly acute when working with very expensive raw materials. Accordingly, more efficient processing is needed to improve yield, reduce processing complexity and expense, improve quality, etc.

In one known method, carbon fiber fabric is used and cut into desired patterns (i.e., fabric charges). These are draped over a pre-form mold to form a preferred 3-dimensional shape and then the fabric is infused with a polymeric resin to create a vehicle component. Unfortunately, the current known process has excessive waste and thus a low yield. Also, the current known method requires significant handling steps as each fabric charge is individually applied to a desired location on the pre-form mold. Further, the current process involves long fabric loading time, long infusion time, long resin cure time, and other disadvantages.

SUMMARY

According to one aspect, a fabric processing method for forming a vehicle component includes providing a first fabric charge, providing a second fabric charge, and forming a multi-piece fabric assembly for single stage draping by stitching together the first and second fabric charges along a neutral stitching path. The method further includes forming the multi-piece fabric assembly into a three-dimensional shape and impregnating the multi-piece fabric assembly with a polymeric material while the multi-piece fabric assembly is formed into the three-dimensional shape.

According to another aspect, a vehicle fabric processing method is provided for forming a three-dimensional component. The method includes arranging first and second fabric charges relative to one another and stitching the first and second fabric charges together along a neutral stitching path. After stitching, the first and second fabric charges are formed into a three-dimensional shape. After forming into the three-dimensional shape, the first and second fabric charges are infused with a polymeric material.

According to a further aspect, a vehicle component includes an impregnated multi-piece fabric assembly comprising at least a first fabric charge and a second fabric charge stitched together along a neutral stitching path. The first and second fabric charges have distal portions spaced apart from the neutral stitching path that are three-dimensionally oriented relative to one another and relative to the neutral stitching path.

BRIEF DESCRIPTION OF THE DRAWINGS

FIG. 8 schematically shows stitching occurring along a neutral stitching path to stitch together the first, second, and third fabric charges into a multi-piece fabric assembly.

FIG. 9 schematically shows presentation of the multi-piece fabric assembly for draping onto a pre-form member.

DETAILED DESCRIPTION

Figure 1:
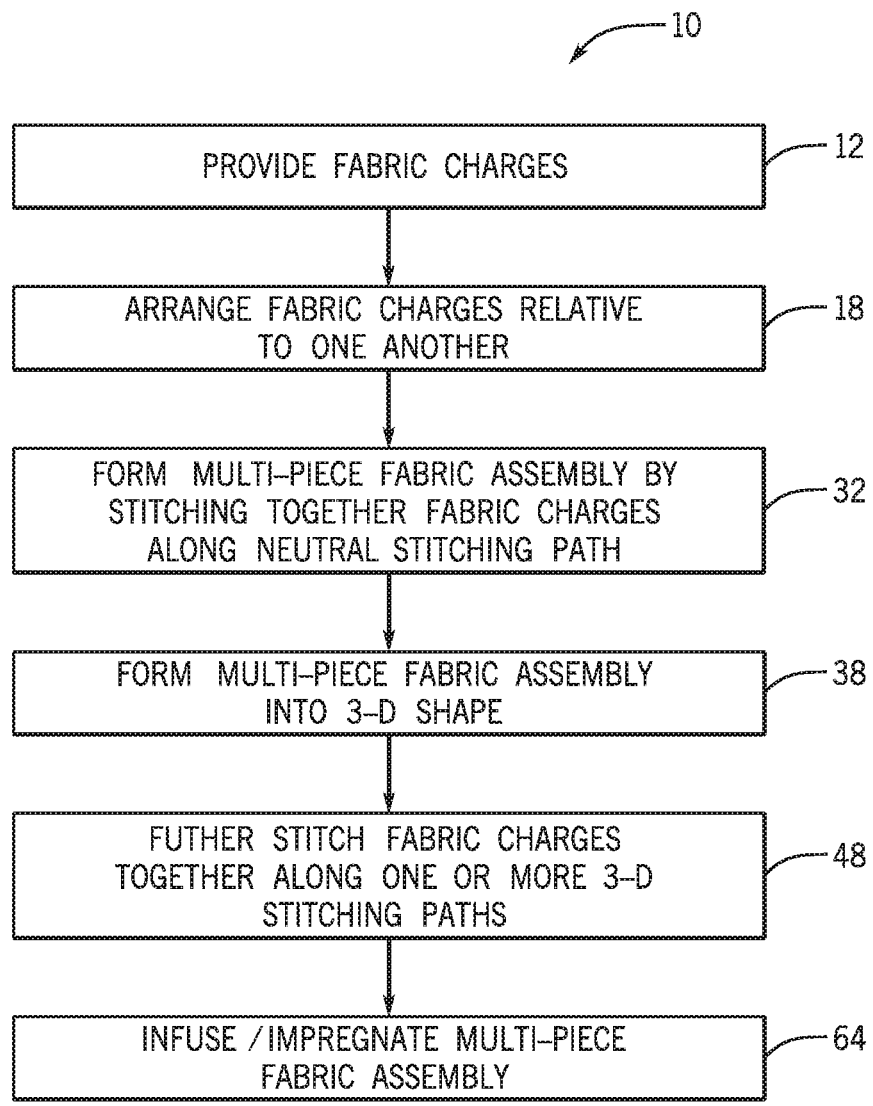
FIG. 1 is a block diagram schematically illustrating a fabric processing method accordingly to an exemplary embodiment.
Figure 2:
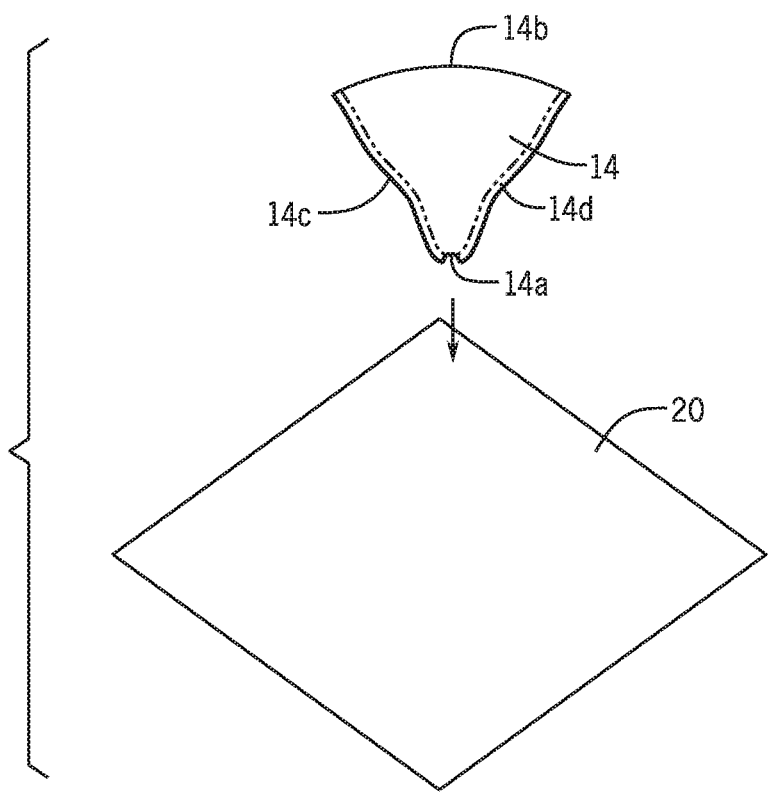
FIG. 2 is a schematic illustration of a first fabric charge presented for placement on a staging platen.
Figure 3:
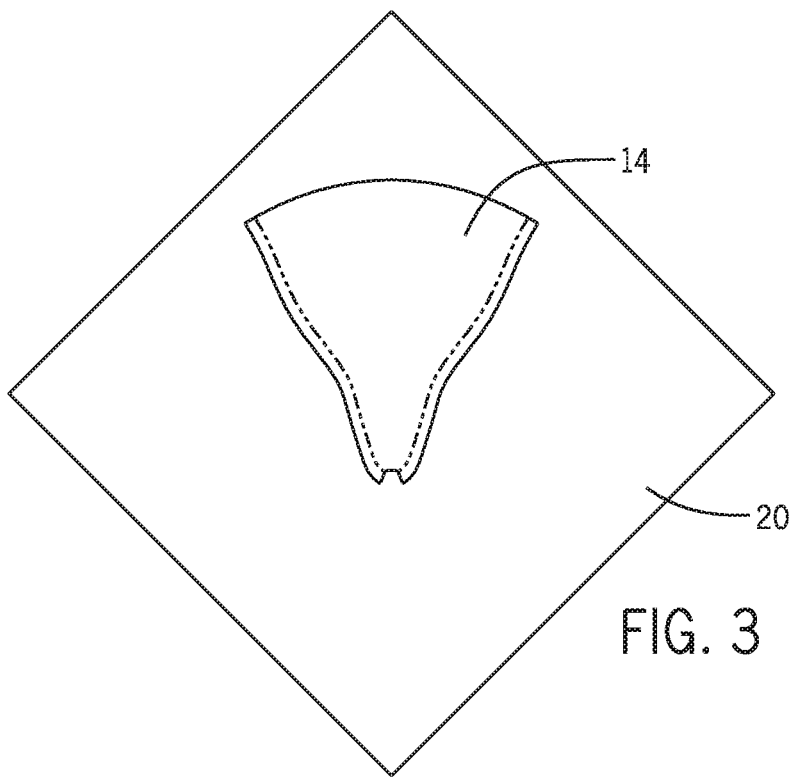
FIG. 3 schematically shows the first fabric charge arranged on the staging platen.
Figure 4:
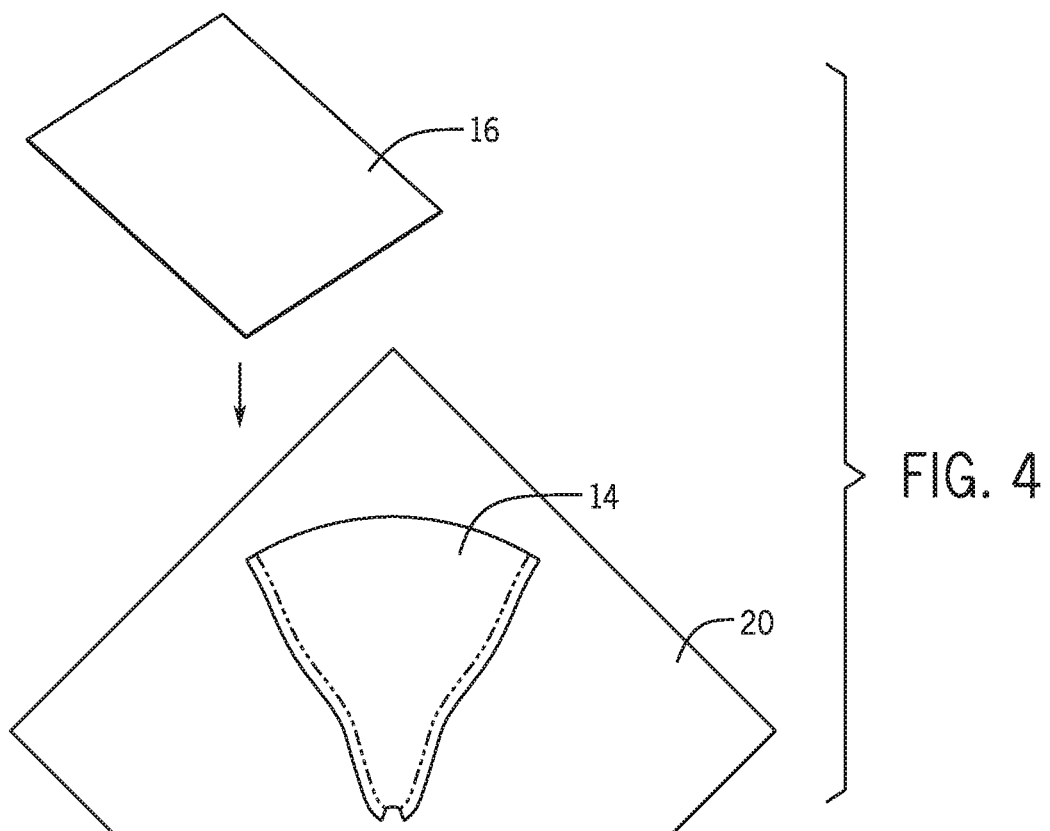
FIG. 4 schematically shows a second fabric charge presented for placement on the staging platen.
Figure 5:
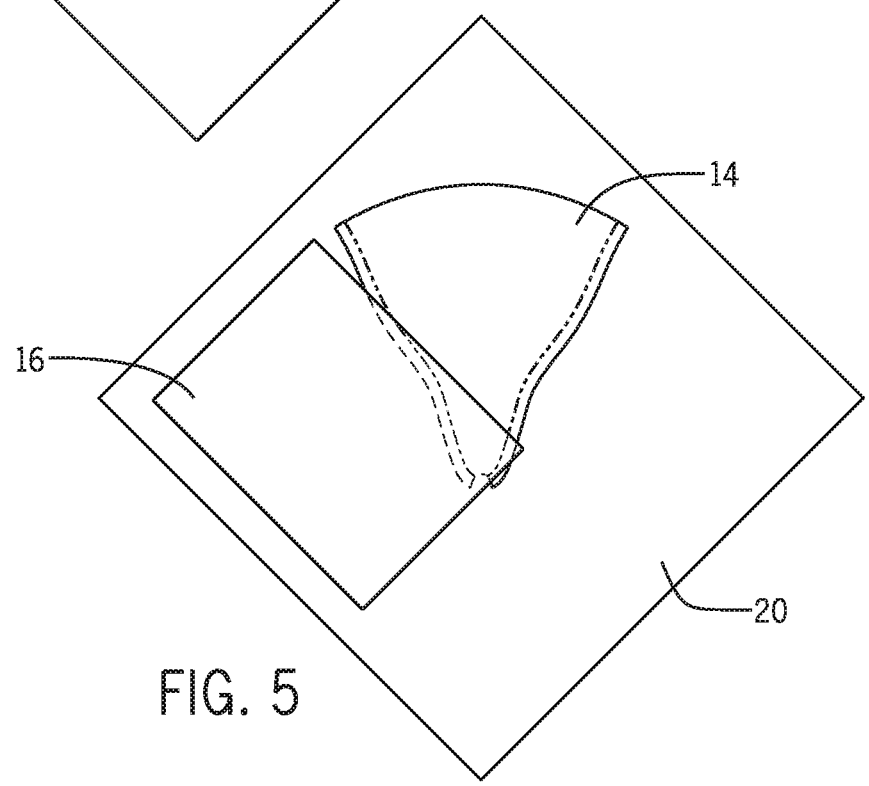
FIG. 5 schematically shows the second fabric charge arranged in overlapping relation on the first fabric charge and on the staging platen.

Referring now to the drawings wherein the showings are only for purposes of illustrating one or more exemplary embodiments and not for purposes of limiting the same, FIG. 1 shows a fabric processing method 10 for forming a vehicle component. In the method, as shown at 12, fabric charges are provided. With additional reference to FIGS. 2-4, this can include providing a first fabric charge 14 and a second fabric charge 16. Once provided, the fabric charges 14, 16 can be arranged relative to one another as indicated at 18 in FIG. 1. In particular, as shown in FIGS. 2 and 3, this can first include placing the first fabric charge 14 on a staging platen 20. The staging platen 20 generally provides a flat or planar work surface arranged in a single plane. Arranging the fabric charges 14, 16 relative to one another in 18 can also include positioning the second fabric charge 16 on the staging platen 20. In particular, the second fabric charge 16 can be arranged so that it overlaps, at least in part, the first fabric charge 14, though alternatively such overlapping could be reversed so that the first fabric charge 14 overlaps the second fabric charge 16.

Figure 6:
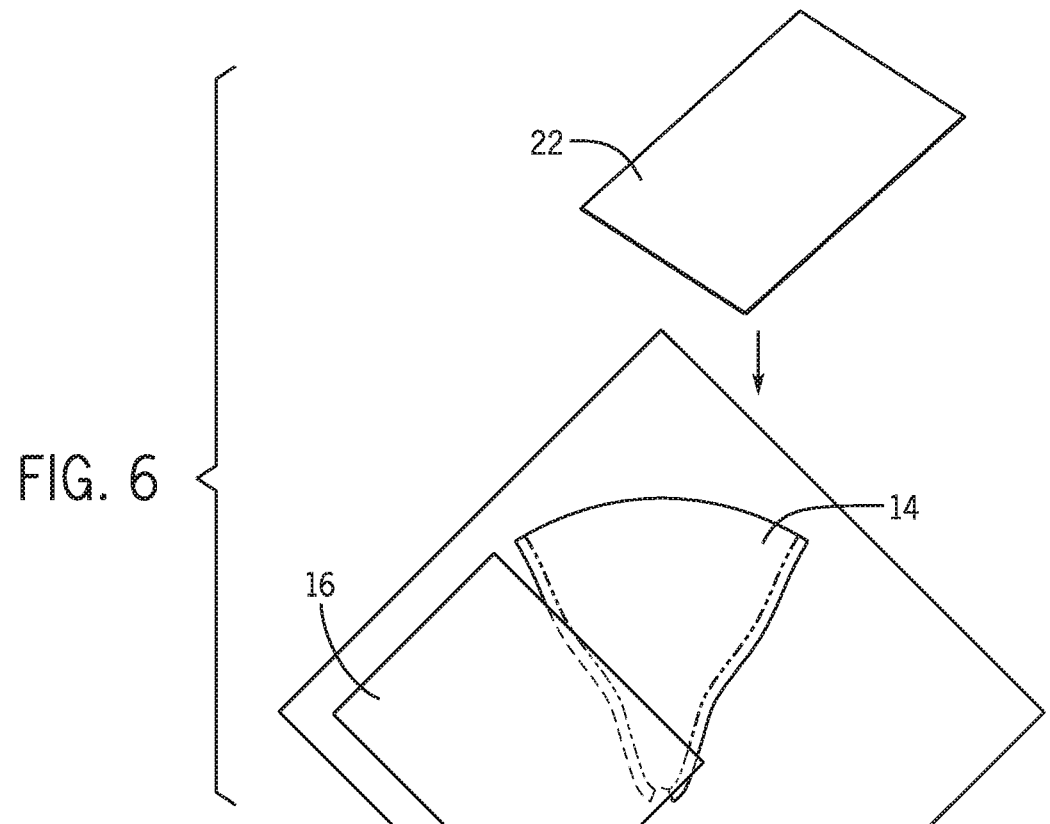
FIG. 6 schematically shows a third fabric charge presented for placement on the staging platen.
Figure 7:
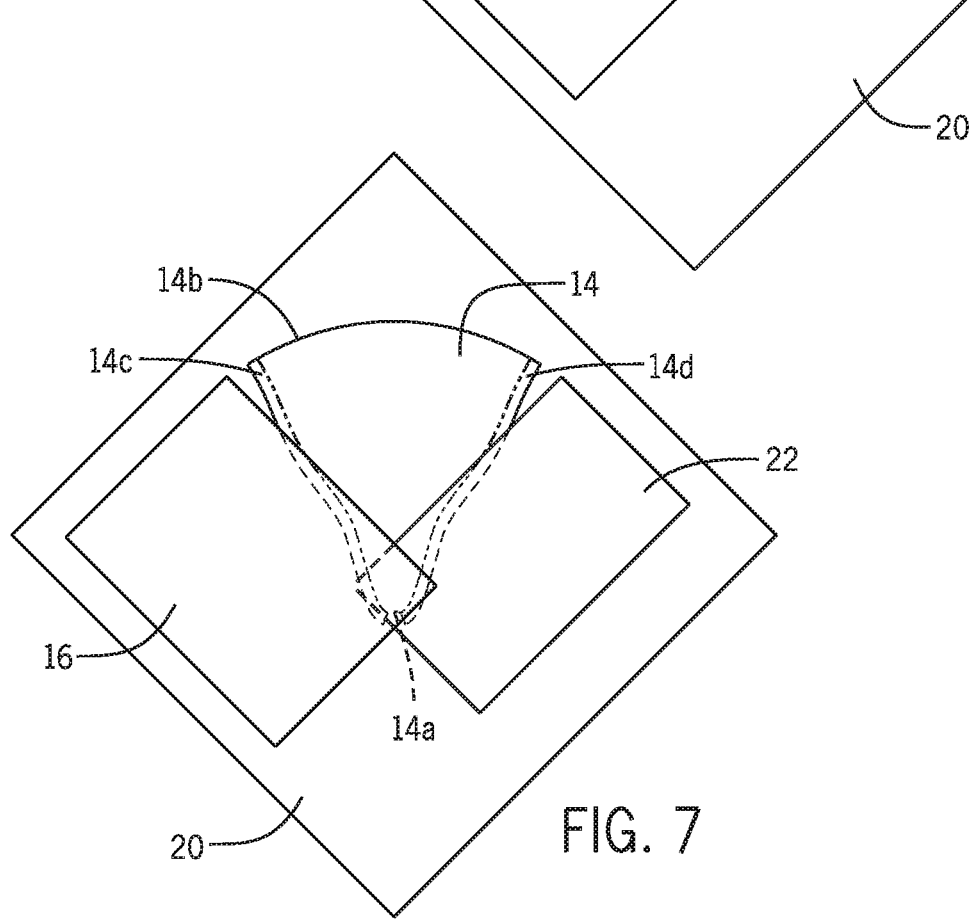
FIG. 7 schematically shows the third fabric charge arranged relative to the first and second fabric charges and positioned on the staging platen.

Additionally, though not required, providing fabric charges in 12 can include providing any number of further fabric charges. For example, with further reference to FIG. 6, a third fabric charge 22 can be provided. When so provided, the third fabric charge 22 (and any additional fabric charges) can be arranged relative to the first and second fabric charges 14, 16 as shown in FIG. 7. Such arrangement can include placement of the additional fabric charges (e.g., fabric charge 22) onto the staging platen 20 and layering (overlapping or underlapping) with respect to the other fabric charges (e.g., the first and second fabric charges 14, 16).

Accordingly, at 18 in FIG. 1, the fabric charges 14, 16, and 22 can be arranged relative to one another. As shown in FIG. 7, by way of example, the third fabric charge 22 can be arranged on the staging platen 20 such that it overlaps the first fabric charge 14, and the second fabric charge 16 can be arranged on the staging platen 20 such that it overlaps both the third fabric charge 22 and the first fabric charge 14. By this arrangement, the third fabric charge 22 is interposed, at least in part, between the first fabric charge 14 and the second fabric charge 16. Of course, as will be understood and appreciated by those skilled in the art, the exact overlapping relationship between or among the fabric charges 14, 16, and 22 can vary relative to the illustrated embodiment.

Once the fabric charges (e.g., fabric charges 14, 16, 18) are arranged relative to one another in a two-dimensional plane, such as on the staging platen 20 as shown in the illustrated embodiment, a multi-piece fabric assembly 30 can be formed for subsequent single stage draping as indicated at 32 in FIG. 1. In particular, the multi-piece fabric assembly 30 can be formed by stitching together the fabric charges (e.g., fabric charges 14, 16, 18) along a neutral stitching path, such as the neutral stitching path 34 illustrated in FIG. 8. In FIG. 8, some stitching 36 is illustrated along the neutral stitching path 34 (i.e., FIG. 8 shows the stitching in progress and shows a stitching device 36a in phantom applying the stitching 36 along the neutral stitching path 34. Accordingly, as shown in the illustrated embodiment, the multi-piece fabric assembly 30 is formed by stitching together the first and second fabric charges 14, 16 along the neutral stitching path 34 and is further formed by stitching together the second and third fabric charges 16, 22 along the neutral stitching path 34. Thus, forming the multi-piece fabric assembly 30 includes, in the illustrated embodiment of FIG. 8, stitching together the first, second, and third fabric charges 14, 16, 22 along the neutral stitching path 34 to form the multi-piece fabric assembly 30 and this occurs in a single plane on the staging platen 20.

Though not shown in FIG. 1, optionally the step of forming the multi-piece fabric assembly 30 by stitching together the fabric charges along a neutral stitching path 34 can include or be considered to include the step 18 of arranging the fabric charges relative to one another. Thus, forming the multi-piece fabric assembly 30 in FIG. 8 by stitching together the first, second, and third fabric charges 14, 16, 22 can include the step shown in 18 of arranging each of the first and second and third fabric charges 14, 16, 22 relative to one another in a two-dimensional plane (e.g., on the staging platen 20) with the first, second, and third fabric charges 14, 16, 22 overlapping one another (i.e., third fabric charge 22 overlapping first fabric charge 14 and second fabric charge 16 overlapping both the third fabric charge 22 and the first fabric charge 14 in the illustrated embodiment of FIG. 8).

Specific to the illustrated embodiment, though not required, the first fabric charge 14 can be a V-shaped corner piece having, with specific reference back to FIG. 2, an inner apex or apex side 14a, an outer wide side 14b, and a pair of flanking or lateral sides 14c, 14d extending between the inner apex or apex side 14a and the outer wide side 14b. Also particular to the illustrated embodiment, the second and third fabric charges 16, 22 can be arranged in 18, respectively, relative to the first fabric charge 14 and in a single two-dimensional plane (i.e., provide by the staging platen 20) such that the second and third charges 16, 22 respectively overlap the first fabric charge 14 a greater amount adjacent the apex or apex side 14a than adjacent the outer wide side 14b. Alternatively, though not shown in the illustrated embodiment, the first fabric charge 14 could overlap the second and third charges 16, 22 a greater amount adjacent the apex or apex side 14a then adjacent the outer wide side 14B. Advantageously, such an arrangement wherein the second and third fabric charges 16, 22 overlap the first fabric charge 14 a greater amount near the apex side 14a, which is particularly enabled by the method disclosed herein, can reduce the amount of trim waste and/or overlap waste related or relative to conventional methods wherein a significant portion of fabric charges are wasted due to trimming and/or due to excessive overlapping. Of course, it should be appreciated by those skilled in the art that the fabric charges can have any size and/or shape and the fabric charges can be optimized so as to best correspond to the final component to be formed to eliminate or reduce the amount of waste, such as by trimming or overlapping.

As shown, the neutral stitching path 34 can extend along the first fabric charge 14 between the flanking sides 14c, 14d and can be spaced apart from each of the inner apex or apex side 14a and the outer wide side 14b. Similarly, the neutral stitching path 34 can be arranged along the second and third fabric charges such that the neutral stitching path 34 extends between respective pairs of flanking sides of the second and third fabric charges (i.e., flanking sides 16c and 16d of the second fabric charge 16 and flanking sides 22c, 22d of the third fabric charge 22). Also, the neutral stitching path can be spaced apart from inner sides 16a, 22a of, respectively, the second fabric charge 16 and the third fabric charge 22 and from outer sides 16Bb, 22bB of, respectively, the second fabric charge 16 and the third fabric charge 22. Of course, the exact neutral stitching path used can vary depending on the fabric charges and/or the final component to be formed.

Returning reference to FIG. 1, after the multi-piece fabric assembly 30 is formed by stitching together the fabric charges along a neutral stitching path as indicated at 32, the multi-piece fabric assembly 30 can be formed into a three-dimensional shape (i.e., a complex shape) as indicated at 38. Accordingly, in the illustrated embodiment, the fabric charges 14, 16, and 22 can be formed into a three-dimensional shape 40, as shown sequentially in FIGS. 9-12, after the stitching 36 is applied along the neutral stitching path 34.

Figure 11:
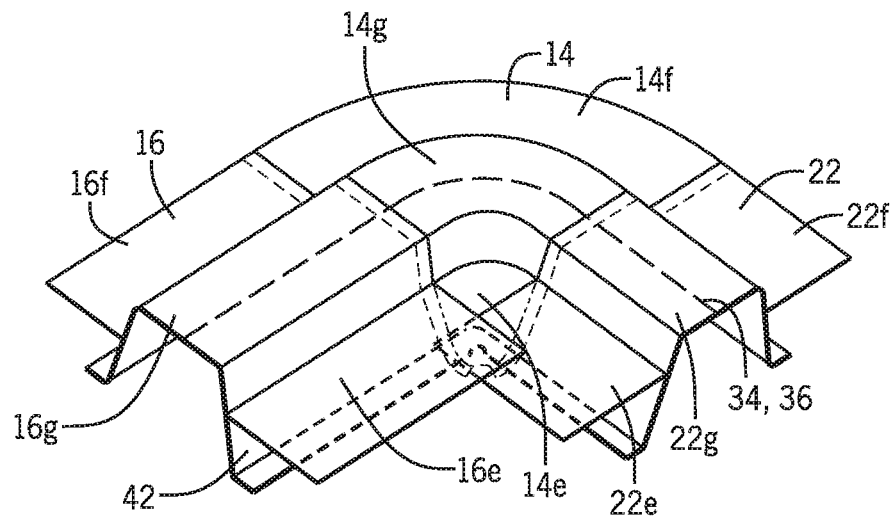
Figure 12:
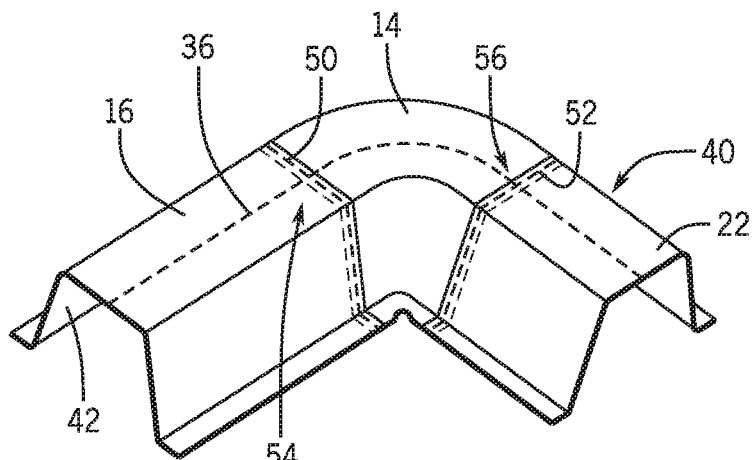

In particular, the final three-dimensional shape 40 is shown in FIG. 12. For the illustrated embodiment, forming the multi-piece fabric assembly 30 into the three-dimensional shape 40 is shown sequentially in FIGS. 9-12. As shown, such forming includes draping the multi-piece fabric assembly 30, which can also be referred to as an integrated fabric charge, over a lower pre-form member 42 in a single draping step. In contrast to known methods, the draping illustrated in FIGS. 9-12 occurs in a single draping step. This is enabled because the individual fabric charges 12, 16, 18 in the illustrated embodiment are integrated into multi-piece fabric assembly 30 via the stitching 36 provided along the neutral stitching path 34. In contrast, in prior known methods, each individual fabric charge was independently laid on a pre-form member resulting in a time-consuming and complex process.

Figure 10:
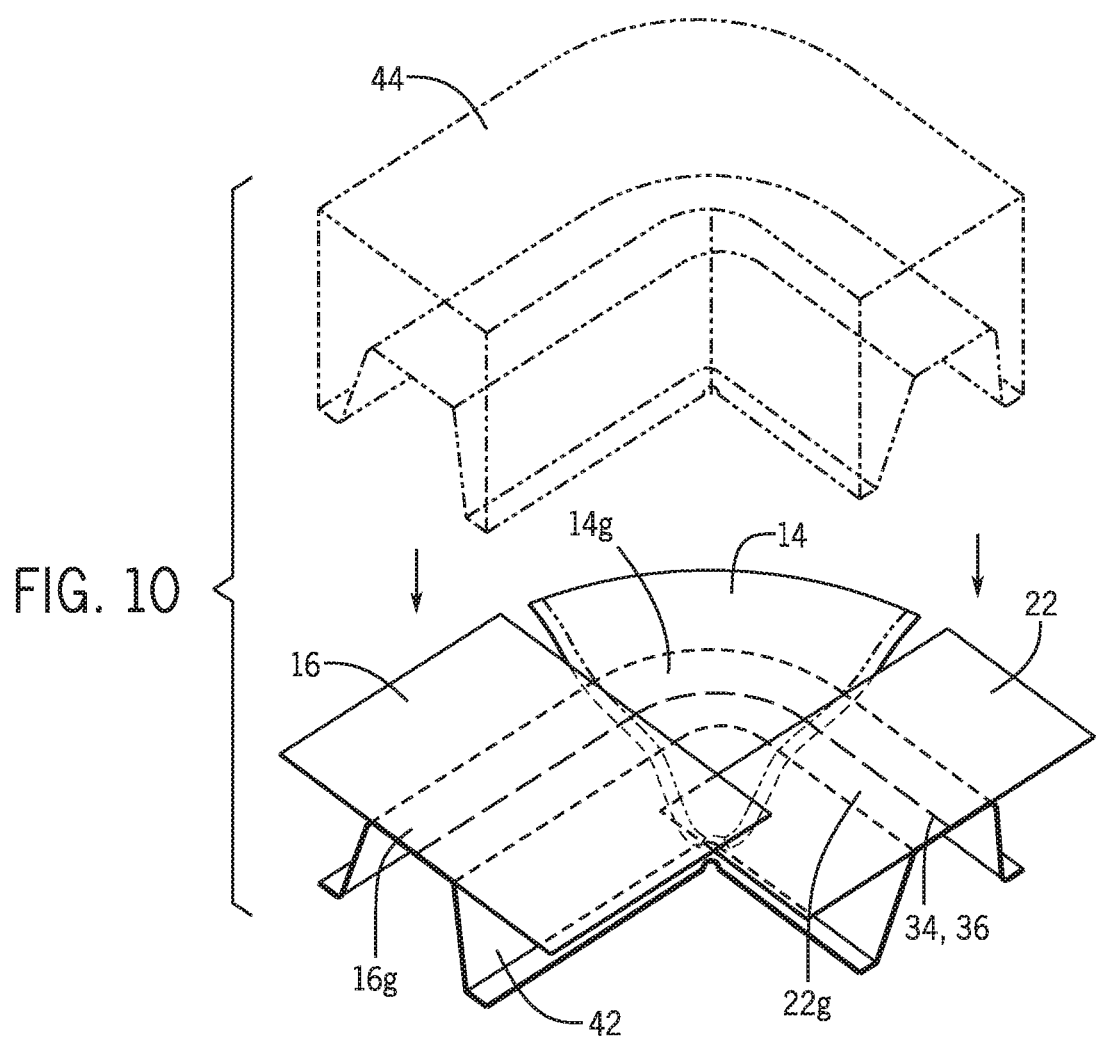
FIGS. 10-12 schematically show the multi-piece fabric assembly being draped onto a lower pre-form member (and stitching applied in FIG. 12).

As shown in the illustrated embodiment (and particularly shown in FIG. 9), the pre-form member 42 can include an upper flat surface or area 42a. As shown in FIG. 10, this area 42a receives directly thereon a portion of the multi-piece fabric assembly 30 that is disposed immediately adjacent the neutral stitching path 34 and thus the area 42a also receives the stitching 36 put in place along the neutral stitching path 34. Then, as shown in FIG. 11, distal portions 14e, 14f, 16e, 16f, 22e, 22f of at least one of the first, second, and third fabric charges 14, 16, 22 can be moved relative to one another and relative to the neutral stitching path 34 while relative alignment between and among the fabric charges 14, 16, 22 is maintained along the neutral stitching path 34. This is shown in sequence in FIGS. 10, 11, and 12. The distal portions particularly include inner distal portions 14e, 16e, and 22e adjacent, respectively, the inner sides 14a, 16a, 22a, and outer distal portions 14f, 16f, 22f disposed adjacent, respectively, the outer sides 14b, 16b, 22b.

Accordingly, forming the fabric charges 14, 16, 22 into the three-dimensional shape 40 of FIG. 12 includes draping the fabric charges 14, 16, 22 over the pre-form member 42 with central portions (i.e., portions 14g, 16g, 16h, respectively, of the first, second, and third fabric charges 14, 16, 22) resting on the area 42a of the pre-form member 42 arranged in a single plane and the distal portions 14e, 14f, 16e, 16Ff, 22e, 22f arranged in orientations angled and varying relative to the single plane defined by the area 42a as best shown in FIG. 12. Such moving of the distal portions 14e, 14f, 16e, 16f, 22e, 22f of the fabric charges 14, 16, 22 can be assisted by an upper pre-form member shown schematically in phantom as 44 in FIG. 10. As the upper pre-form member 44 is drawn or moved toward the pre-form member 42, the multi-piece fabric assembly 30 is formed into the three-dimensional shape 40 shown in FIG. 12.

Returning reference to FIG. 1, as indicated at 48, further stitching can be applied to the fabric charges, including the first, second, and third fabric charges 14, 16, and 22. In particular, the fabric charges 14, 16, and 22 can be further stitched together after the multi-piece fabric assembly 30 is formed into the three-dimensional shape 40 along one or more three-dimensional stitching paths. For example, in the illustrated embodiment and with reference to FIG. 12, further stitching at 48 can occur along a first three-dimensional stitching path 50 and a second three-dimensional stitching path 52. The three-dimensional stitching paths, including the first and second stitching paths 50, 52, can be arranged such that the further stitching includes stitching together overlapping portions of the fabric charges, including the first, second, and third fabric charges 14, 16, 22 in the illustrated embodiment.

As shown, the one or more three-dimensional stitching paths, including stitching paths 50 and 52, can each intersect the neutral stitching path 34 and thus the stitching 36 to form respective stitching intersections 54, 56 with each of the three-dimensional stitching paths being approximately perpendicular (i.e., perpendicular or nearly perpendicular, such as 90 degrees+/−five degrees) relative to the neutral stitching path 34 and thus stitching 36 at the respective stitching intersections 54, 56. In the illustrated embodiment, the first stitching path 50 is formed or disposed along the side 16d of the second fabric charge and the side 14c of the first fabric charge 14. As already discussed herein, the side 16d can slightly overlap (e.g., 15 mm overlap) the side 14c of the first fabric charge 14. Similarly, the second stitching path 52 can be disposed on or adjacent the side 22c of the third fabric charge 22 and the side 14d of the first fabric charge 14 with a slight overlap (e.g., 15 mm overlap). Although not shown, it is to be appreciated that other variations of overlap could be used. For example, the overlap could be approximately 30 mm or some other dimension.

Figure 13:
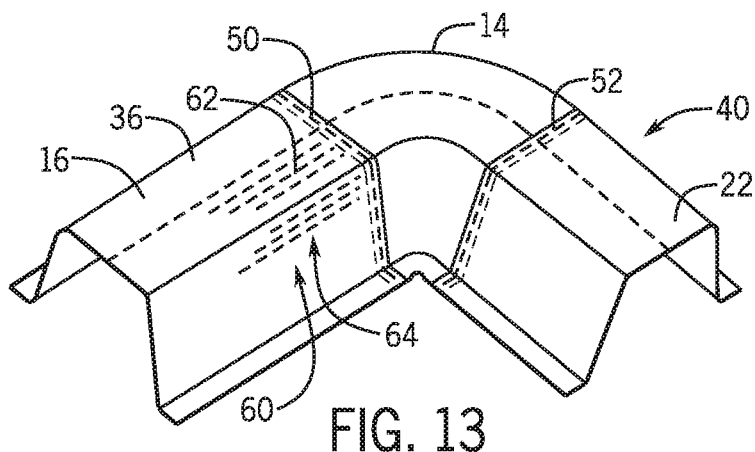
FIGS. 13 and 14 schematically illustrate the multi-piece fabric assembly with additional reinforcement stitching patterns.
Figure 14:
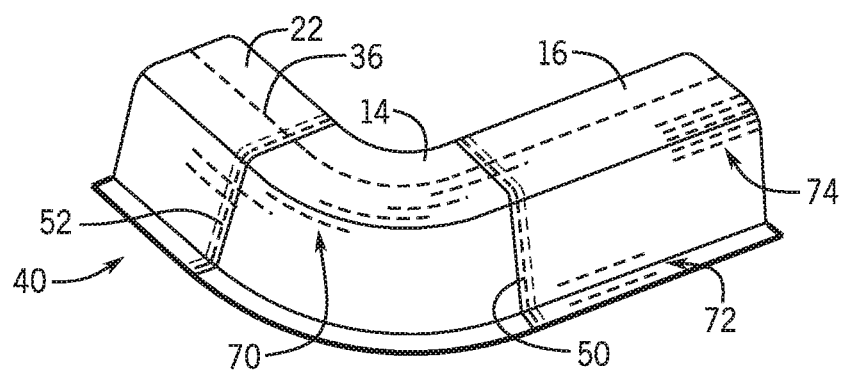
Figure 15:
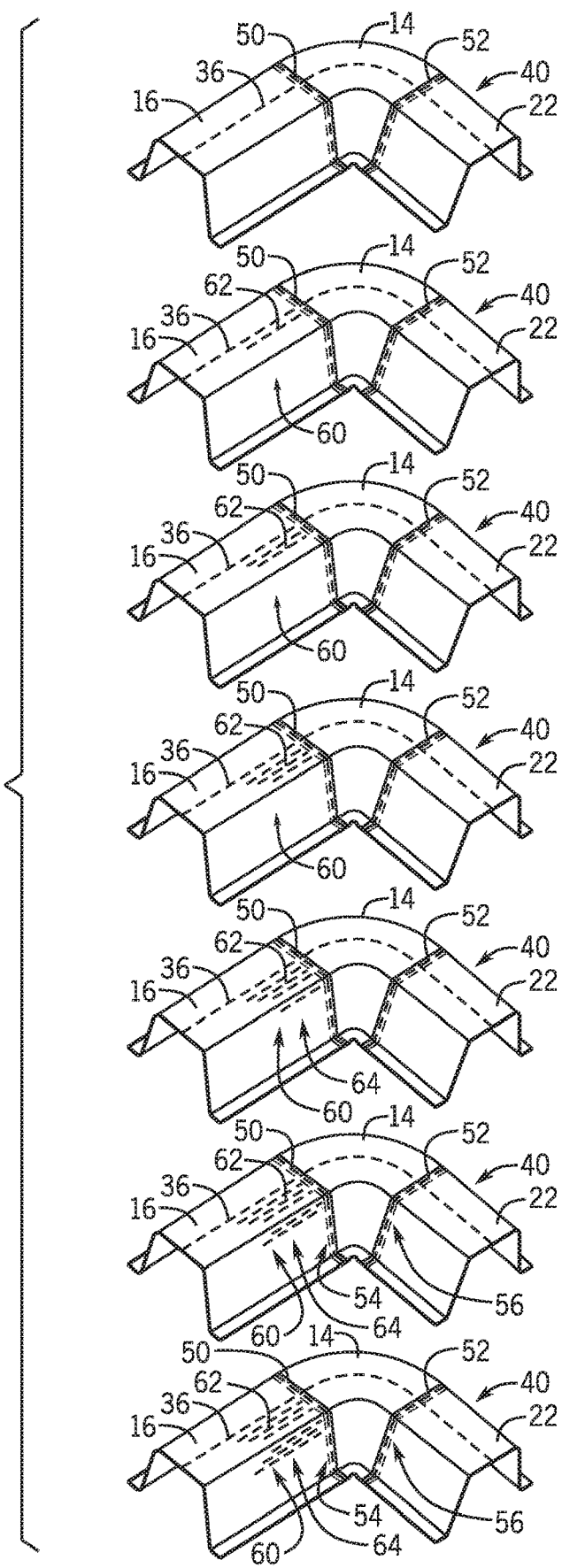
FIGS. 15-18 schematically illustrate sequences of stitching for the additional reinforcement stitching patterns of FIGS. 13 and 14.
Figure 16:
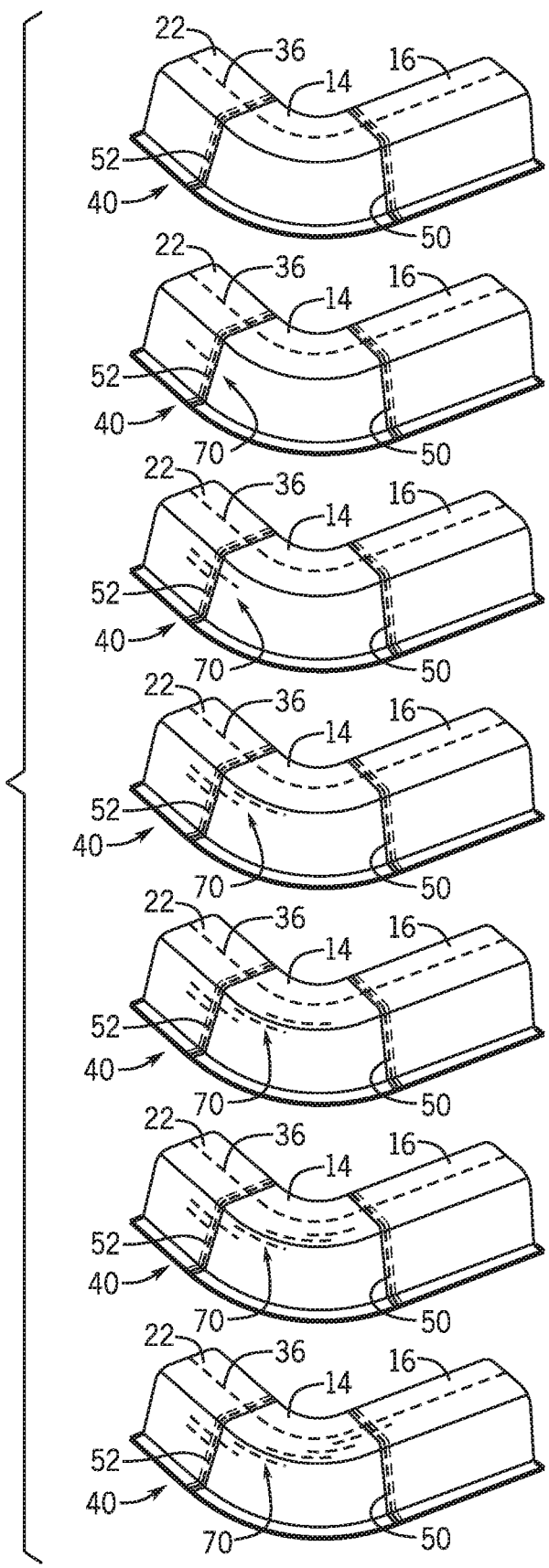
Figure 17:
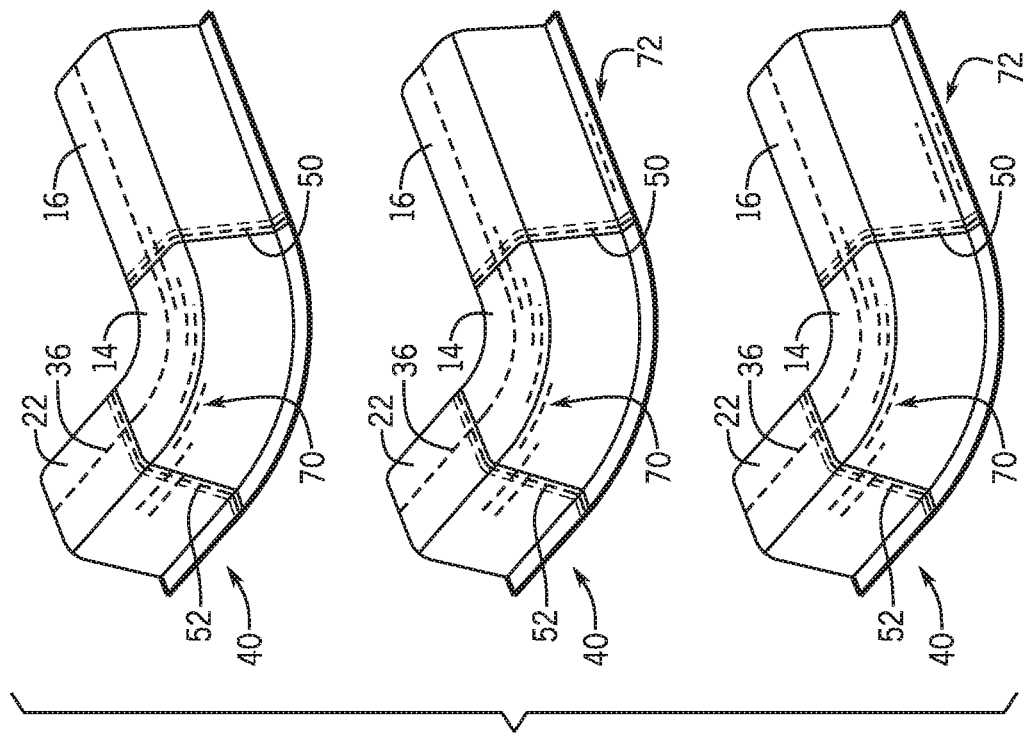
Figure 18:
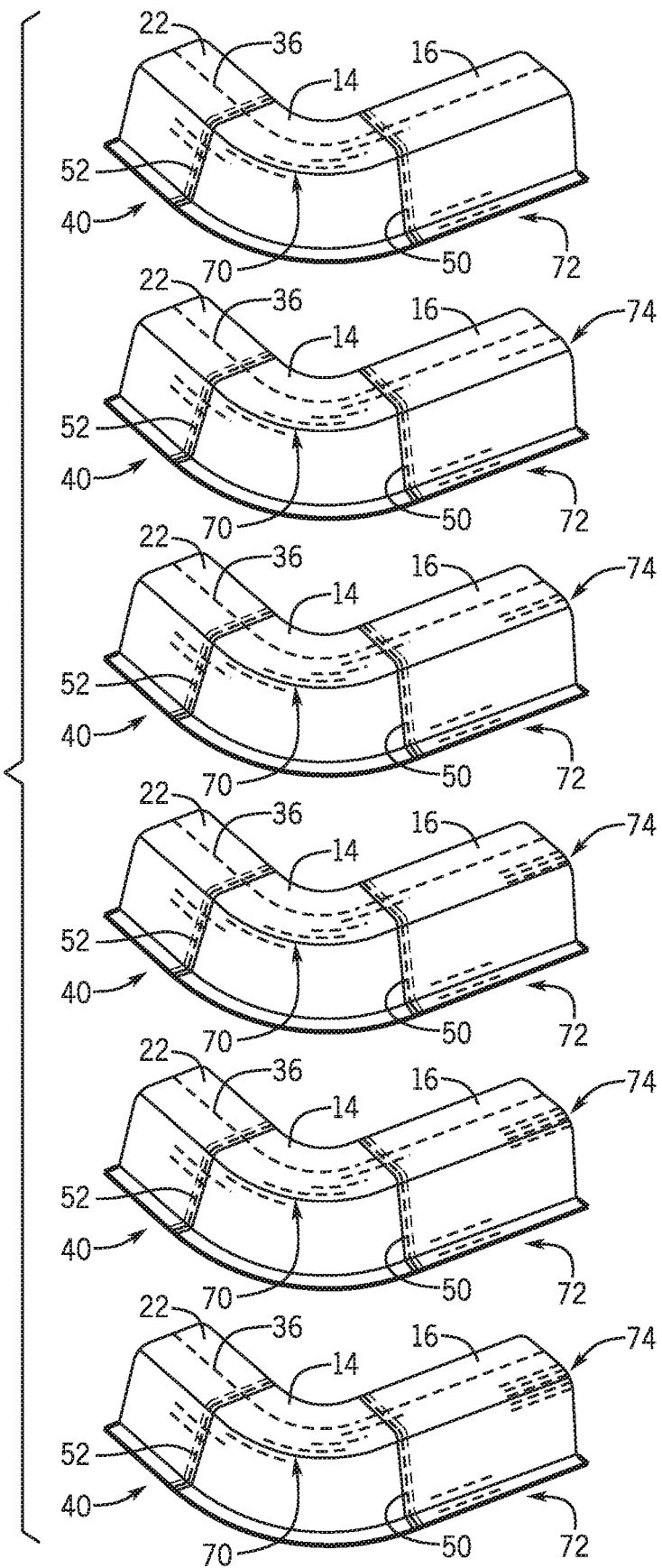

In addition to the three-dimensional stitching paths 50, 52, additional stitching can be applied to functionally critical geometries of the fabric charges, including the first, second, and third fabric charges 14, 16, and 22. This additional stitching allows for more efficient connectivity between the fabric layers rather than depending on the shear stress transfer through a much lower stiffness resin matrix. By way of example, in FIG. 13, a stitching pattern 60 is created to locally enhance the connectivity on both sides of a functionally significant portion of a radius on the final three-dimensional shape 40. The stitching pattern 60 can include a first group of stitching 62 provided on the central portion 16g and a second group of stitching 64 provided on the inner distal portion 16e of the second fabric charge 16. The stitching pattern 60 can be approximately perpendicular relative to the stitching path 50. FIG. 14 illustrates another example of the final three-dimensional shape 40. Stitching patterns 70, 72 and 74 are created to locally enhance the connectivity leading up to, through, and after a radius on the final three-dimensional shape 40. Each of the stitching patterns 70, 72, and 74 can be provided in addition to or separately from the other stitching patterns including stitching pattern 60 described above. As depicted, the individual stitching paths of each of stitching pattern 60, 70, 72 and 74 can be of differing lengths. Further, different stitching patterns could be implemented based on the preferred stress flow in the part geometry, as well as the sequence each of the stitching pattern 60, 70, 72 and 74 is implemented which can influence processing and fabric tolerance management. Examples of stitching sequences for each of the stitching patterns 60, 70, 72, and 74 are depicted in FIGS. 15, 16, 17 and 18, respectively.

Figure 19:
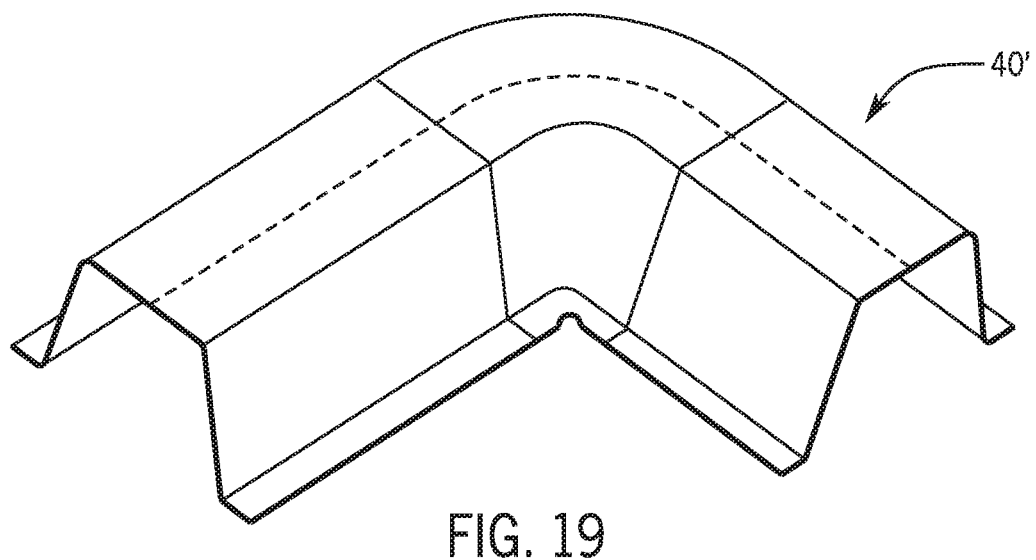
FIG. 19 schematically illustrates an alternate arrangement wherein a multi-piece fabric assembly having zero overlap between fabric charges is draped onto a lower pre-form member according to an alternate exemplary embodiment.

Alternatively, the fabric charges 14, 16, and 22 could be sized and arranged such that when stitched together along the neutral stitching path 34 there is no measurable overlap between the fabric charges 14, 16, 22 when the multi-piece fabric assembly 30 is formed into the three-dimensional shape 40 without any trimming occurring after the fabric charges 14, 16, 22 are stitched together along the neutral stitching path 34. Thus, there would be no overlap between the fabric charges. In this case, there would be no three-dimensional stitching and step 48 could be removed from the method 10 of FIG. 1. An example of such a three-dimensional shape 40' according to this alternate embodiment is shown in FIG. 19.

With or without the further stitching, returning reference to FIG. 1, the fabric charges, including the first, second, and third fabric charges 14, 16, 22, can next be infused with a polymeric material (i.e., after forming into the three-dimensional shape 40), as indicated at 64. For example, the multi-piece fabric assembly 30 can be impregnated with a polymeric material while the multi-piece fabric assembly is formed into the three-dimensional shape.

Figure 20:
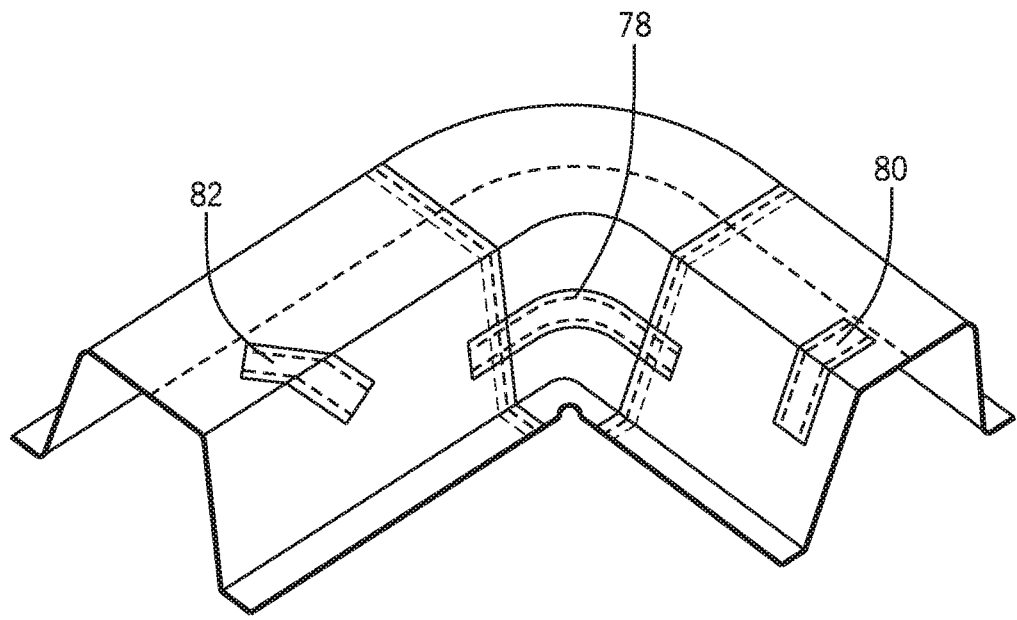
FIG. 20 schematically illustrates another alternate arrangement wherein reinforcement charges are applied to a multi-piece fabric assembly, such as the one shown in FIGS. 8-12, according to an alternate exemplary embodiment.

With reference now to FIG. 20, optionally, one or more local reinforcement charges, such as illustrated local reinforcement charges 78, 80, and 82, can be stitched onto the multi-piece fabric assembly 30 after the multi-piece fabric assembly 30 is formed into the three-dimensional shape 40. As shown, the reinforcement charges, including charges 78, 80, 82, can be smaller in size than each of the first, second, and third fabric charges 14, 16, 22. By way example, the locations for the reinforcement charges 78, 82 can be areas of high stress expected in the final, fully cured application, can help provide stiffness to a desired local area, and/or can increase fabric stability due to resin injection fluid loading. The local reinforcement charges 78, 80, 82 can be formed of the same material as the fabric charges 14, 16, 22.

Figure 21:
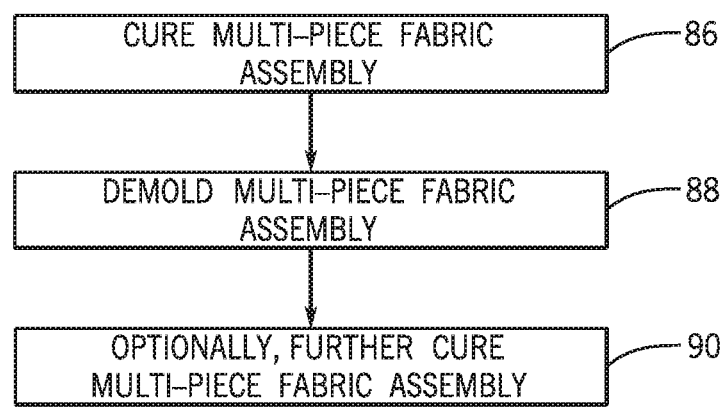
FIG. 21 is a block diagram schematically illustrating further steps for the fabric processing method of FIG. 1.

Now with reference to FIG. 21, the method 10 of FIG. 1 can continue. In particular, after infusing at 64, the multi-piece fabric assembly 30, including the fabric charges 14, 16, 18, can be cured prior to demolding from the pre-form members 42, 44, as indicated at 86. After some curing at 86, the multi-piece fabric assembly 30, including the fabric charges 14, 16, and 22, can be demolded (i.e., removed) from the pre-form members 42, 44, as indicated at 88. Next, optionally, further curing can occur for the multi-piece fabric assembly 30, including the fabric charges 14, 16, and 22 after demolding as indicated at 90.

The resultant product is a three-dimensional component that can be applied on a vehicle, such as forming the vehicle's frame (or a portion of the frame) or some other vehicle component. Such a vehicle component formed according to the method or methods described hereinabove can comprise an impregnated multi-piece fabric assembly, such as multi-piece fabric assembly 30, that itself comprises at least a first fabric charge and a second fabric charge (e.g., first, second, and third fabric charges 14, 16, and 22) stitched together along the neutral stitching path 34. As already described herein, the fabric charges can have distal portions spaced apart from the neutral stitching path 34 that are three-dimensionally oriented relative to one another and relative to the neutral stitching path 34. Optionally, the distal portions 14e, 14f, 16e, 16f, 22e, 22f of the fabric charges 14, 16, 22 can be stitched together along one or more three-dimensionally stitching paths, such as the stitching paths 50 and 52.

It is contemplated that different stitch patterns can be used, particularly along the neutral stitching path 34. Such different stitching patterns can be used to balance differential forming loads between sides of the fabric charges, particularly during draping over the pre-form member. To minimize excessive local fabric distortion and stitching or even within a given fabric charge, different stitching patterns can be employed to help create compliance between different fabric charges and/or to help stabilize a fabric local area against highly localized distortion due to challenging forming geometry.

Still further, it is contemplated that multiple layers of fabric charges could be added and built up on top of one another to create the thickened fabric charge. Such material could then be stitched along a neutral stitching path as described herein in order to allow a single draping operation to apply shape to the material. Still further, optional frictional inserts (not shown) could be interposed between layers of fabric charges to help ease forming. In particular, this could avoid unwanted distortion in the material. The material for the friction reducing member could be in the form of a powder, as part of a thermal plastic material binder used in pre-forming fabrics, or could be a separate sheet material that is installed during a stacking process for the fabric charges and then removed after draping has been completed (and before resin injection)

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the present disclosure.

The invention claimed is:

1. A vehicle component, comprising:
an impregnated multi-piece fabric assembly comprising at least a first fabric charge and a second fabric charge stitched together along a neutral stitching path, wherein the first and second fabric charges each have distal portions that are spaced apart from the neutral stitching path, and are three-dimensionally oriented relative to one another and relative to the neutral stitching path, wherein the first fabric charge is a V-shaped corner piece having an inner apex or apex side that forms a notch in the first fabric charge, an outer wide side, and a pair of flanking sides extending between the inner apex or apex side and the outer wide side.

2. The vehicle component of claim 1 wherein the distal portions of the first and second fabric charges are stitched together along one or more three-dimensional stitching paths.

3. The vehicle component of claim 2 wherein the one or more three dimensional stitching paths each intersect the neutral stitching path to form a stitching intersection and are each approximately perpendicular relative to the neutral stitching path at the stitching intersection.

4. The vehicle component of claim 1 wherein the multi-piece fabric assembly is formed from arranging each of the first and second fabric charges relative to one another on a single plane with at least one of the first and second fabric charges overlapping the other of the first and second fabric charges.

5. The vehicle component of claim 1 wherein the multi-piece fabric assembly further includes a third fabric charge that is stitched together with the first and second fabric charges along the neutral stitching path.

6. The vehicle component of claim 5 wherein the multi-piece fabric assembly is formed from arranging each of the first, second and third fabric charges relative to one another on a two-dimensional plane with the first, second and third fabric charges overlapping one another.

7. The vehicle component of claim 1 wherein the neutral stitching path extends along the first fabric charge between the pair of flanking sides and is spaced apart from each of the inner apex or apex side and the outer wide side.

8. The vehicle component of claim 1 wherein a local reinforcement charge is stitched onto the multi-piece fabric assembly, and the reinforcement charge is smaller in size than the each of the first and second fabric charges.

9. The vehicle component of claim 1, wherein a three-dimensional stitching path is disposed along a side in the pair of sides extending between the inner apex or apex side and the outer wide side of the first fabric charge, and disposed along a side of the second fabric charge overlapping the first fabric charge.

10. The vehicle component of claim 1, wherein the multi-piece fabric assembly is formed from draping the first fabric charge and the second fabric charge over a pre-form member such that central portions of the first fabric charge and the second fabric charge rest on an area of the pre-form member that defines a single plane, and the distal portions of the first fabric charge and the second fabric charge are arranged in orientations angled and varying relative to the single plane defined by the pre-form member.

11. A vehicle component, comprising:
an impregnated multi-piece fabric assembly comprising at least a first fabric charge and a second fabric charge stitched together along a neutral stitching path, wherein the first and second fabric charges each have distal portions that are spaced apart from the neutral stitching path, and are three-dimensionally oriented relative to one another and relative to the neutral stitching path, wherein the first fabric charge is a V-shaped corner piece having an inner apex or apex side, an outer wide side, and a pair of flanking sides extending between the inner apex or apex side and the outer wide side, wherein the multi-piece fabric assembly further includes a third fabric charge that is stitched together with the first and second fabric charges along the neutral stitching path, wherein the second and third fabric charges are arranged, respectively, relative to the first fabric charge on a single two-dimensional plane such that the second and third fabric charges respectively overlap, or are overlapped by, the first fabric charge a greater amount adjacent the inner apex or apex side than adjacent the outer wide side, and wherein the second fabric charge is more proximal to a first flanking side in the pair of flanking sides as compared to a second flanking side in the pair of flanking sides, and the third fabric charge is more proximal to the second flanking side as compared to the first flanking side.

12. The vehicle component of claim 1, wherein the multi-piece fabric assembly is formed from arranging the first fabric charge and the second fabric charge relative to one another on a single plane provided by a staging platen, at least one of the first and second fabric charges overlapping the other of the first and second fabric charges along the staging platen.

13. A vehicle component, comprising:
an impregnated multi-piece fabric assembly comprising at least a first fabric charge and a second fabric charge stitched together along a neutral stitching path, wherein the first and second fabric charges each have distal portions that are spaced apart from the neutral stitching path, and are three-dimensionally oriented relative to one another and relative to the neutral stitching path, wherein the distal portions of the first and second fabric charges are stitched together along one or more three-dimensional stitching paths, wherein one or more reinforcing stitching patterns extend parallel to the neutral stitching path and intersect the one or more three-dimensional stitching paths, wherein each of the first and second fabric charges are arranged relative to one another on a single plane and stitched along the neutral stitching path on the single plane, and the distal portions of the first and second fabric charges are arranged in orientations angled and varying relative to the single plane, wherein the first fabric charge is a V-shaped corner piece having an inner apex or apex side, an outer wide side, and a pair of flanking sides extending between the inner apex or apex side and the outer wide side, wherein the multi-piece fabric assembly further includes a third fabric charge that is stitched together with the first and second fabric charges along the neutral stitching path, and wherein the second fabric charge is more proximal to a first flanking side in the pair of flanking sides as compared to a second flanking side in the pair of flanking sides, and the third fabric charge is more proximal to the second flanking side as compared to the first flanking side, and wherein the second and third fabric charges respectively overlap, or are overlapped by, the first fabric charge a greater amount adjacent the inner apex or apex side than adjacent the outer wide side.

14. The vehicle component of claim 13 wherein the one or more three dimensional stitching paths each intersect the neutral stitching path to form a stitching intersection and are each approximately perpendicular relative to the neutral stitching path at the stitching intersection.

* * * * *